United States Patent
Bergman et al.

(10) Patent No.: US 11,098,837 B2
(45) Date of Patent: Aug. 24, 2021

(54) FITTING ELEMENT FOR USE IN REHABILITATION OF PIPELINES AND METHOD FOR PRODUCING THE SAME

(71) Applicant: MOCS BEHEER B.V., Delft (NL)

(72) Inventors: Anande Bergman, Delft (NL); Peter Madlener, Rotterdam (NL); Wouter Albert Arie Riedijk, Rotterdam (NL); Dean Baggen, Rotterdam (NL)

(73) Assignee: MOCS BEHEER B.V., Delft (NL)

( * ) Notice: Subject to any disclaimer, the term of this patent is extended or adjusted under 35 U.S.C. 154(b) by 167 days.

(21) Appl. No.: 16/479,971

(22) PCT Filed: Jan. 24, 2018

(86) PCT No.: PCT/NL2018/050051
§ 371 (c)(1),
(2) Date: Jul. 23, 2019

(87) PCT Pub. No.: WO2018/139923
PCT Pub. Date: Aug. 2, 2018

(65) Prior Publication Data
US 2019/0338881 A1    Nov. 7, 2019

(30) Foreign Application Priority Data

Jan. 24, 2017 (NL) .................. 2018224

(51) Int. Cl.
*F16L 33/28* (2006.01)
*F16L 55/165* (2006.01)
(Continued)

(52) U.S. Cl.
CPC ........ *F16L 55/1656* (2013.01); *B29C 63/36* (2013.01); *B29C 70/845* (2013.01);
(Continued)

(58) Field of Classification Search
CPC ..... F16L 55/1656; F16L 33/28; F16L 45/179; B29C 70/54; B29C 65/00; B29C 65/48
(Continued)

(56) References Cited

U.S. PATENT DOCUMENTS 3,920,049 A * 11/1975 Lippert ............... F16L 9/12
138/109
4,065,339 A * 12/1977 Lippert ............... B29C 57/00
156/149
(Continued)

FOREIGN PATENT DOCUMENTS

| DE | 102008063651 A1 | 7/2010 |
| EP | 2602097 A2 | 6/2013 |
| WO | 2016133393 A1 | 8/2016 |

OTHER PUBLICATIONS

International Search Report and Written Opinion for the International Patent Application No. PCT/NL2018/050051, dated Apr. 20, 2018, 12 pages.

*Primary Examiner* — Patrick F Brinson
(74) *Attorney, Agent, or Firm* — Kacvinsky Daisak Bluni PLLC

(57) ABSTRACT

A fitting element for use in rehabilitation of pipelines with a liner. The fitting element is a composite article of reinforcing fibers and a resin composition. A first part of the fitting element has reinforcing fibers and a substantially fully cured resin composition, and a second part has dry reinforcing fibers that can accept a curable resin composition that optionally originates from the liner to form a functional joint between the fitting element and the liner. An interface layer of the fitting element structurally connects the first and the second part. A method for manufacturing the fitting element, as well as a method for rehabilitation of a pipeline with a
(Continued)

tubular liner and a joined assembly of the fitting element and a liner for use in rehabilitating a pipeline.

20 Claims, 6 Drawing Sheets

(51) Int. Cl.
    *B29C 63/36*     (2006.01)
    *B29C 70/84*     (2006.01)
    *B29C 70/86*     (2006.01)
    *F16L 55/179*     (2006.01)
    *B29K 67/00*     (2006.01)
    *B29K 105/08*     (2006.01)
    *B29K 309/08*     (2006.01)

(52) U.S. Cl.
    CPC .............. *B29C 70/86* (2013.01); *F16L 33/28* (2013.01); *F16L 55/1651* (2013.01); *F16L 55/179* (2013.01); *B29K 2067/06* (2013.01); *B29K 2105/0854* (2013.01); *B29K 2309/08* (2013.01)

(58) Field of Classification Search
    USPC ............................................. 138/98, 97, 109
    See application file for complete search history.

(56) References Cited

U.S. PATENT DOCUMENTS

| | | | | |
|---|---|---|---|---|
| 4,813,457 A | * | 3/1989 | Offringa | ............... B29C 70/766 138/109 |
| 2014/0119813 A1 | | 5/2014 | Moselage, III | |

* cited by examiner

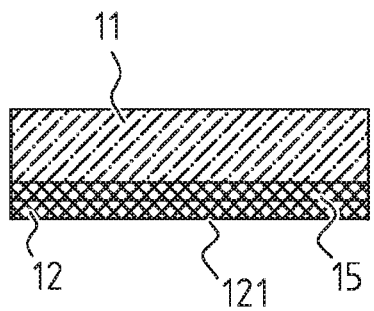
FIG. 5A
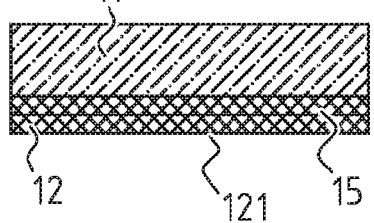
FIG. 5B
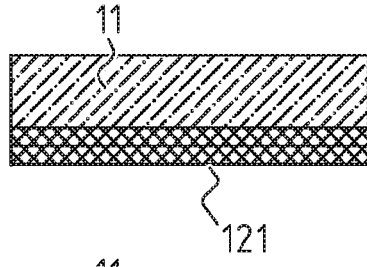
FIG. 5C
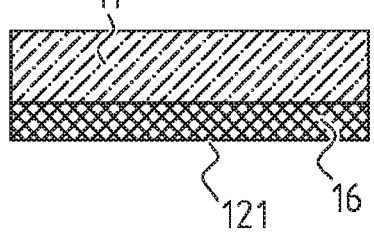
FIG. 5D
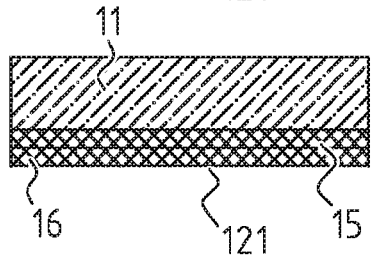
FIG. 5E
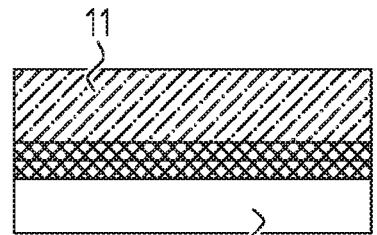
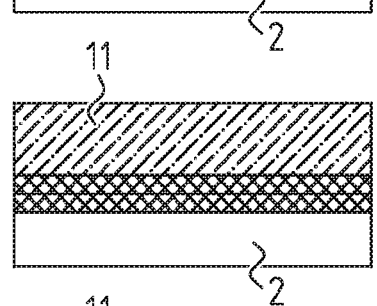
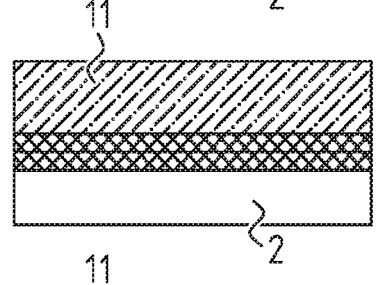
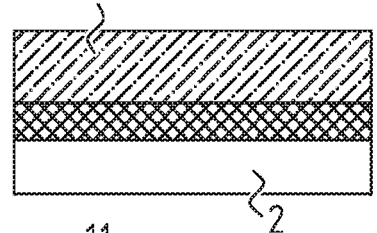
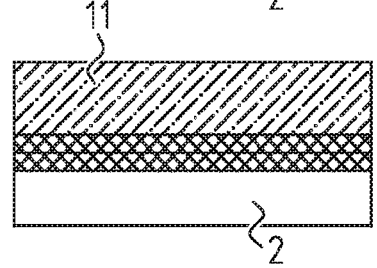

FITTING ELEMENT FOR USE IN REHABILITATION OF PIPELINES AND METHOD FOR PRODUCING THE SAME

This is a national stage application filed under 35 U.S.C. § 371 of pending international application PCT/NL2018/050051 filed Jan. 24, 2018, which claims priority to Netherlands Patent application NL 2018224, filed Jan. 24, 2017, the entirety of which applications are hereby incorporated by reference herein.

FIELD OF THE INVENTION

The present invention relates to a fitting element for use in rehabilitation of pipelines with a liner. The invention further relates to a method for manufacturing the fitting element. In another aspect, the invention relates to a method for rehabilitation of a pipeline with a tubular liner of reinforcing fibers and a curable resin composition, and to a joined assembly of the fitting element and a liner for rehabilitating a pipeline.

BACKGROUND OF THE INVENTION

In-situ internal covering of pipelines with a liner comprising reinforcing fibers and a curable resin composition is increasingly used in rehabilitation of damaged pipelines. A typical method involves providing a resin-impregnated composite tube made of polyester, fibreglass cloth or a number of other materials suitable for resin impregnation, inverting the tube and/or pulling it into the damaged pipe. The liner may for instance be inverted using water or air pressure. Hot water, UV light, ambient cured or steam for instance may subsequently be used as medium to cure the resin and solidify the liner with the expectation of forming a relatively tight-fitting, preferably jointless and corrosion-resistant replacement pipe, also referred to as a CIPP (cured in place pipe).

CIPP liners may be installed into a damaged pipe from an upstream access point, for instance provided by a manhole or other excavation. At such an access point, the liner needs to be connected to another liner, to an existing pipe (segment), to a valve or to a pump for instance.

In order to connect a liner with another liner of another pipe (segment)s, the liner needs to be provided with a fitting element. This is typically done by welding steel flanges to a free end of the damaged host pipe, and connecting the liner with said steel flange. This procedure however is time consuming, and needs to be executed by an expert worker to ensure a reliable connection between the liner, the flange and the pipe.

WO 2016/133393 A1 discloses a fitting element for use in rehabilitation of pipelines with a liner. A first part of the fitting element comprises reinforcing fibers and a substantially fully cured resin composition, whereas a second part of the fitting element comprises reinforcing fibers and a partially cured or B-staged resin composition. The second part is used as a bondable surface but cannot accept any curable resin composition that originates from a source outside the fitting element. Further, the first and second parts are not structurally connected in a thickness direction of the fitting element through reinforcing fibers extending in said thickness direction. The fitting element therefore is prone to delamination.

US 2014/0119813 A1 teaches a method for exposing part of the reinforcing fibers in a prepreg laminate. In the method, a gel is used to displace resin in the part to be exposed. After curing, the gel is removed leaving a part with exposed fibers. The exposed part is used as a bondable surface by contacting exposed parts of two laminates and introducing an adhesive between said parts. The strength of the joint thus produced is limited by the strength of the adhesive. The known method further requires the use of a gel that needs to be removed later. The exposed fibers therefore are not virgin 'dry' fibers as produced, but may comprise remaining gel particles and/or prepreg resin. Surface coatings of the reinforcing fibers such as sizings and binders may also be affected by the presence of the gel, which may reduce the bonding strength.

It would be desirable to provide a more efficient and reliable way to connect a liner to another liner or to a fitting element during a pipe rehabilitation process instantaneously and on the long run during the working life of the rehabilitated pipe, whereby the connection mitigates or even prevents disadvantages of the prior art methods.

SUMMARY OF THE INVENTION

In a first aspect of the invention there is provided a fitting element for a liner in accordance with claim 1. The fitting element comprises a composite article of reinforcing fibers and a resin composition, wherein a first part of the fitting element comprises reinforcing fibers and a substantially fully cured resin composition, wherein a second part of the fitting element comprises dry reinforcing fibers that can accept a curable resin composition that optionally originates from the liner to form a functional joint between the fitting element and at least a part of the liner, and wherein an interface layer of the fitting element structurally connects the first and the second part.

The invented fitting element may be cured in place (in situ) and may generate a joint with the impregnated liner when the last one is cured. Indeed, the fitting element has at least two parts: a first, solid (cured) part that provides the shape to the fitting element, and a second part, for instance provided at an inner surface of the fitting element, which facilitates structural joining with the liner. After curing the liner—preferably in situ—together with the fitting element, a strong joint is obtained between both. This results in a liner provided with an integrated fitting element. A good adhesion between the fitting element and the liner is achieved in this way. This is important, as the liners typically used in pipe rehabilitation tend to shrink after curing, and this can result in a delamination between the components (pipe, fitting element, liner).

The invented fitting element provides a second part in which the reinforcing fibers are dry. The properties of the reinforcing fibers are preferably 'as produced', including any processing and adhesion aids provided by the fiber manufacturer onto the fibers.

A second aspect of the invention provides a method for rehabilitation of a pipeline with a tubular liner of reinforcing fibers and a curable resin composition, the method comprising providing a fitting element in accordance with the invention in coaxial alignment with an end of the pipeline, providing a part of the liner under pressure against at least the second part of the fitting element, and curing the curable resin composition of the liner whereby liner curable resin composition is accepted by the dry reinforcing fibers of the second part to form a functional joint between the fitting element and the liner part, and/or a curable resin composition is applied to the second part and co-cured to form the functional joint.

In a third aspect of the invention, a joined assembly of the fitting element and a liner for rehabilitating a pipeline is provided, wherein a second part of the fitting element and an edge part of the liner overlap in a bondable area and are substantially fully cured to form a functional joint.

Although not limited in shape, suitable examples of the invented fitting element comprise a coupling, flange, elbow, tee section, and the like. An embodiment of the invention provides a fitting element comprising a flange for coupling to another component of the pipeline system.

An embodiment of the invention provides a fitting element, wherein the reinforcing fibers of the first part differ from the reinforcing fibers of the second part in the material used and/or in their material form.

Thermosetting composite articles are typically adhered to other articles by adhesive bonding or by mechanical joints, such as bolting, both of which have disadvantages. Adhesive bonding is costly, sometimes hazardous to the environment, and the quality of bonding achieved is generally sensitive to variations in process parameters. The quality of an adhesive bond indeed depends on surface properties and craftsmanship, making it a rather unreliable way of joining composite articles, such as a liner and a fitting element. Extra material is added and surface treatments are generally time consuming and dependent on circumstances. Bolting on the other hand produces holes in the articles to be connected, which gives rise to stress concentrations and possibly premature failure. The fitting element in accordance with the present invention is readily transportable and yet provides a bondable surface that may be joined to (a bondable surface of) a liner in-situ to produce a functionally joined assembly.

A functional joint between the fitting element and the liner is meant to represent a joint that enables the assembly of element and liner to be useful for at least one of the principal functions for which the assembly is designed or is used. Two typical functional joints are structural joints and sealing joint that provide liquid or gas tightness.

A structural joint between the fitting element and the liner is meant to represent a joint that contributes to the load bearing capacity of the joined assembly, and is able to transfer functional loads between the fitting element and the liner. Functional loads may be but are not limited to design loads, primary loads and other expected loads which need to be transferred to ensure structural integrity of the assembly.

According to another embodiment of the invention, a fitting element is provided wherein the material form of the reinforcing fibers of the second part comprises a surface and that fibers extend in a direction that is out of this surface. Planar material forms of reinforcing fibers defining said surface include but are not limited to parallel oriented unidirectional fabrics, woven fabrics having two or more fiber directions, randomly oriented fiber mats, and/or felts, the latter being preferred.

The interface layer in the fitting element according to the invention may be provided in any conceivable way, which at least partly depends on the manufacturing method of the fitting element, elucidated further below. An embodiment of the invented fitting element is characterized in that the interface layer comprises reinforcing fibers of the first part. In another embodiment, the interface layer comprises reinforcing fibers of the second part. Yet another useful embodiment relates to a fitting element wherein the interface layer comprises an adhesive. In this embodiment, the second part may be bonded to the first part by the adhesive.

A particularly preferred embodiment provides a fitting element wherein the interface layer comprises reinforcing fibres of the second part and resin composition originating from the first part. Such a fitting element has a particularly strong and durable interface strength. An adhesive may be added as an alternative to the resin of the first part, or may be added in addition to the resin of the first part.

In another embodiment of the invention, a fitting element is provided comprising a third part, the third part comprising a partially cured thermosetting resin composition such that it comprises reactive moieties. The thermosetting resin composition of the first part of the fitting element is substantially fully cured, which provides the fitting element with a solid first part that has the desired mechanical properties, and is easily handled, transported and the like. The fitting element, by providing a bondable third part thereof, may be joined to other articles such as a liner whenever this is needed. Since the thermosetting resin composition of the third part is partially cured only and therefore comprises reactive moieties, it can be bonded to another part, or to the liner to produce a functional joint between corresponding reactive moieties. Such bonding may be stronger than provided by a secondary bond, such as the bond between a cured thermoset composite article and an adhesive layer applied to its surface.

According to the invention, the first thermosetting resin composition is substantially fully cured. A substantially fully cured first thermosetting resin composition can be obtained in accordance with a curing cycle recommended by the supplier of the first thermosetting resin composition, or in accordance with a curing cycle that produces a similar result. A post-cure may be applicable.

With the wording 'substantial' or 'substantially' is meant in the context of the present application at least 70% of the indicated property, more preferably at least 80%, even more preferably at least 90%, and most preferably at least 95% of the indicated property.

According to an embodiment of the invention, the thermosetting resin composition of the third part is partially cured such that it still comprises reactive moieties. A partial cure is defined as any degree of cure that differs from zero and from a fully cured state. The degree of cure of the thermosetting resin composition may be established according to well known standard practices. A suitable and widely used technique measures (changes in) enthalpy using Differential Scanning calorimetry (DSC). The degree or extent of cure is defined as the change in enthalpy that has occurred, compared to the total change of enthalpy of a complete reaction (a substantially full cure or 100% degree of cure). The total change of enthalpy involved in completing a curing reaction is determined by using a slow temperature ramp from a low temperature to a temperature close to the onset of thermal degradation. To define the degree of cure of the thermosetting resin composition of the third part would involve taking a sample of such resin from the second part, and determining the residual change in enthalpy using a slow temperature ramp from a low temperature to a temperature close to the onset of thermal degradation of the thermosetting resin. The degree of cure is then defined by the ratio of the total enthalpy change minus the residual enthalpy change, to the total enthalpy change of the resin. Although DSC is the technique of choice in determining degree of cure and therefore a state of partial cure of the thermosetting resin composition, other techniques may also be used, such as Dynamic Mechanical Analysis (DMA) for instance.

An embodiment of the invention provides a fitting element wherein the thermosetting resin composition of the third part is B-staged. The wording "B-staged" as employed herein designates that partial curing (partial crosslinking) of the thermosetting resin composition has occurred. The "B-stage" of a thermosetting resin composition is well known to one skilled in the art and is defined by an intermediate stage in the reaction of certain thermosetting resins in which the material softens when heated and swells when in contact with certain liquids, but may not entirely fuse or dissolve. In the B-stage, a thermosetting resin may provide a tacky surface but this is not essential. Third parts of the invented fitting element may be joined and heated to further cure the thermosetting resin composition in the third parts and create a primary bond between said third part and another part, such as a first and/or second part.

The present embodiment of the fitting element according to the invention comprises a first substantially fully cured part and a third part that comprises a partially cured thermosetting resin. In producing such embodiment, care has to be taken to avoid premature curing of the thermosetting resin composition of the third part while curing the first thermosetting resin composition. One way of achieving this objective is provided by an embodiment of the fitting element wherein the thermosetting resin composition of the third part has a curing temperature, and wherein the reactivity of the thermosetting resin composition of the first part is higher than the reactivity of the thermosetting resin composition of the third part at a temperature lower than the curing temperature of the thermosetting resin composition of the third part.

The third part of the embodiment offers a bondable surface for a certain period of time. The time frame that offers a bondable surface depends on a number of parameters including the temperature at which the fitting element is stored. In order to delay the cure of the thermosetting resin composition of the third part, the fitting element may have to be stored at temperatures lower than the temperature at which the curing reaction is initiated. Such a storage temperature may be below 0° C.

In a useful embodiment of the fitting element, the thermosetting resin composition of the third part is stable at a temperature of −10° C. In such embodiment, the resin will not substantially cure (change its degree of cure) at a temperature of −10° C. for at least one day, more preferably for at least one week, even more preferably for at least one month, even more preferably for at least three months, and most preferably for at least six months.

In other useful embodiments, the thermosetting resin composition of the third part is stable at a temperature of −5° C., more preferably at a temperature of 0° C., even more preferably at a temperature of 5° C., even more preferably at a temperature of 10° C., even more preferably at a temperature of 15° C., and most preferably at room temperature. With room temperature is meant a temperature between 15 and 40° C.

In an embodiment of the fitting element of the invention, the thermosetting resin compositions of the first and third part have a different degree of cure. Such difference may be created by first and third resin compositions that comprise the same constituents (monomers and hardeners for instance) but that have been cured to different extents. In another embodiment of the invention, a fitting element is provided wherein the monomer composition of the first thermosetting resin composition differs from the monomer composition of the third thermosetting resin composition. The different constituents of both resin compositions allow a straightforward tuning of the reactivity and degree of cure in the article. Such embodiments may provide a fitting element wherein the reactivity and/or monomer composition of the first part differ from the reactivity and/or monomer composition of the third part.

A useful embodiment provides a fitting element wherein the third part comprises the interface layer.

The volumetric percentage of the first and second parts of the fitting element relative to the fitting element's total volume may be chosen within a wide range. It is possible for instance that the second part of the fitting element comprises as much as 90% by volume of the fitting element. In a preferred embodiment of the composite fitting element, the second part of the fitting element comprises at most 60% by volume of the fitting element, more preferable at most 50% by volume of the fitting element, even more preferably at most 40% by volume of the fitting element, even more preferably at most 30% by volume of the fitting element, even more preferably at most 20% by volume of the fitting element, and most preferably at most 10% by volume of the fitting element. The first part of the fitting element then preferably occupies the remaining volume. In other embodiments, the second part of the fitting element comprises at least 5% by volume of the fitting element, and more preferably at least 10% by volume of the fitting element.

In an embodiment of the composite fitting element according to the invention, the first part is continuous across the element and provides dimensional stability to the element and supports the second part or parts. With a continuous first part is meant a first part that extends across the element uninterruptedly. Such a first part may however locally comprise holes etc., as long as a line can be found that runs in the first part from one end of the element to an opposed end of the element in an uninterrupted fashion.

The cured first part of the fitting element in this embodiment provides shape stability to the element, so that it can be transported and handled, even with the dry second part(s) or an optional partly cured third part. After the first curing cycle (or production step), the element's shape is (substantially) defined and does not need additional supporting structures to be handled. In addition to this, tooling for a subsequent curing cycle, such as when curing the liner onto the fitting element or curing an optional third part, can be simplified or even omitted, thanks to the shape stability of the first part of the element.

A particularly useful embodiment is provided by a fitting element comprising a circumferential body of which an outer circumferential shell forms the first part, and an inner circumferential shell forms the second part, or vice versa. Such an embodiment of the invention provides a composite element having a thickness, the second part extending over part of said thickness. This embodiment provides a bondable surface on one side of the element and a solid substantially fully cured surface on an opposite side of the element.

Another embodiment relates to a fitting element wherein a circumferential shell interposed between the outer and inner circumferential shells forms the third part.

Although any one of the circumferential shells of the fitting element may extend over a part of the circumference of the fitting element only, a practical embodiment provides a fitting element wherein any one of the circumferential shells of the fitting element extends over the substantially complete circumference of the fitting element.

The thermosetting resin compositions of a fitting element in accordance with the invention may be chosen within a wide range of available thermosetting resin compositions. The thermosetting resin composition of the optional third part is preferably available in a stable partly cured state. In an embodiment of the invention, a fitting element is provided wherein the thermosetting resin composition comprises an epoxy, unsaturated polyester, phenolic, polyurethane, or bismaleimide resin/hardener mixture, or combinations thereof, such as two-component systems based on thermosetting urethane. An epoxy and/or unsaturated polyester resin/hardener mixture is particularly preferred.

An assembly of a liner and an invented fitting element attached to a free end of the liner may be advantageously used in pipeline rehabilitation. In an embodiment of the invention, the fitting element further comprises a protective part for a free edge of the liner.

A preferred fitting element is characterized in that the protective part connects with the liner, for instance through a welding connection. The connection between the protective part and the liner's free edge may however also be achieved in other ways, such as by adhesive bonding for instance. In an embodiment, the protective part of the fitting element comprises a thermoset insert that can be welded to the liner to seal the free edge of the liner.

A joint of the fitting element with first and second parts and a liner may result in a chemical joint (or more specifically a crosslinked joint) between the element and the liner after the second part has been provided with a curable resin composition that optionally originates from the liner itself, and the curing cycle of the curable resin composition of the second part has been achieved. Generally, two interfaces in such a joined assembly can be identified: a first interface layer between the first and second parts, and a second interface between the second part of the element and the liner surface. The first interface is generated when the first part of the fitting element is substantially fully cured while the second part remains dry. The interface layer provides the connection between both parts. Joining of the fitting element and a liner can be achieved by contacting surfaces of the liner and a second part of the fitting element and co-curing to form a joint.

A fourth aspect of the invention provides a method for manufacturing the fitting element, the method comprising providing a mold, applying dry reinforcing fibers onto a surface of the mold to form the second part, combining reinforcing fibers and a resin composition around the second part to form the first part of the fitting element, and curing the thermosetting resin composition to a substantially fully cured stage.

The reinforcing fibers may be combined with the thermosetting resin composition(s) in any known way. Suitable examples include but are not limited to hand lay-up, in which reinforcing fibers are impregnated with a thermosetting resin composition by hand, for instance with a brush or roller; resin infusion methods such as RTM, in which the thermosetting resin is injected or sucked into a closed mold provided with reinforcing fibers, or vacuum infusion; pultrusion, in which reinforcing fibers are led through a thermosetting resin bath and subsequently through a heated die; rotational casing molding in which a thermosetting resin is brought into a rotating mold and pressed through reinforcing fibers provided in the mold by centrifugal force; and filament winding. A method in accordance with a preferred embodiment combines reinforcing fibers and the first and optionally third thermosetting resin compositions to form the first and optional third part of the fitting element by impregnating the reinforcing fibers with the first and optional third thermosetting resin composition and filament winding the impregnated reinforcing fibers onto the first part, provided on a mandrel defining the shape of the element and/or pultruding the impregnated reinforcing fibers through a die. Alternatively, reinforcing fibers and the first and optionally third thermosetting resin compositions may be combined to form the first and optional third part of the fitting element by impregnating the reinforcing fibers with the first and optional third thermosetting resin composition and filament winding the impregnated reinforcing fibers onto a mandrel defining the shape of the element and applying the first part of dry reinforcement onto the applied first and optional third parts.

In a practical embodiment of the method, impregnating the reinforcing fibers with the first and optionally third thermosetting resin compositions is performed by providing first and second thermosetting resin baths and leading the reinforcing fibers through either one of said baths. Leading the reinforcing fibers through a bath comprising the first thermosetting resin composition will produce first parts, whereas leading the reinforcing fibers through a bath comprising the third thermosetting resin composition will produce the optional third parts of the fitting element.

Other useful embodiments of the invention relate to a method wherein combining reinforcing fibers and the first and optional third thermosetting resin compositions to form the first and optional third part of the fitting element is performed by impregnating the reinforcing fibers with the first and optional third thermosetting resin composition through vacuum infusion or resin transfer molding (RTM).

Accordingly, an embodiment of the invention relates to a method wherein combining reinforcing fibers and a thermosetting resin composition to form the first and optionally third part of the fitting element is performed by impregnating the reinforcing fibers with the resin composition and filament winding the impregnated reinforcing fibers onto the mold.

Another embodiment relates to a method wherein the third part is manufactured by applying a semi-impregnated reinforcement, comprising dry reinforcement of which part of the thickness is impregnated with resin composition, onto the mold and applying fibres and resin composition to form the first part.

The composite fitting element according to the invention may comprise other components, such as metal inserts, foam or honeycomb core, thermoplastic or thermosetting films, bonded thereto by other methods than according to the invention, or any other material that can be incorporated as an integral part of such a fitting element.

BRIEF DESCRIPTION OF THE FIGURES

The invention will now be described in more detail by way of example, without however being limited thereto and with reference to the accompanying figures in which:

FIGS. 5A to 5E schematically represent wall parts of several embodiments of a fitting element according to the invention showing first, second and optionally third parts;

DESCRIPTION OF PREFERRED EMBODIMENTS

Figure 1:
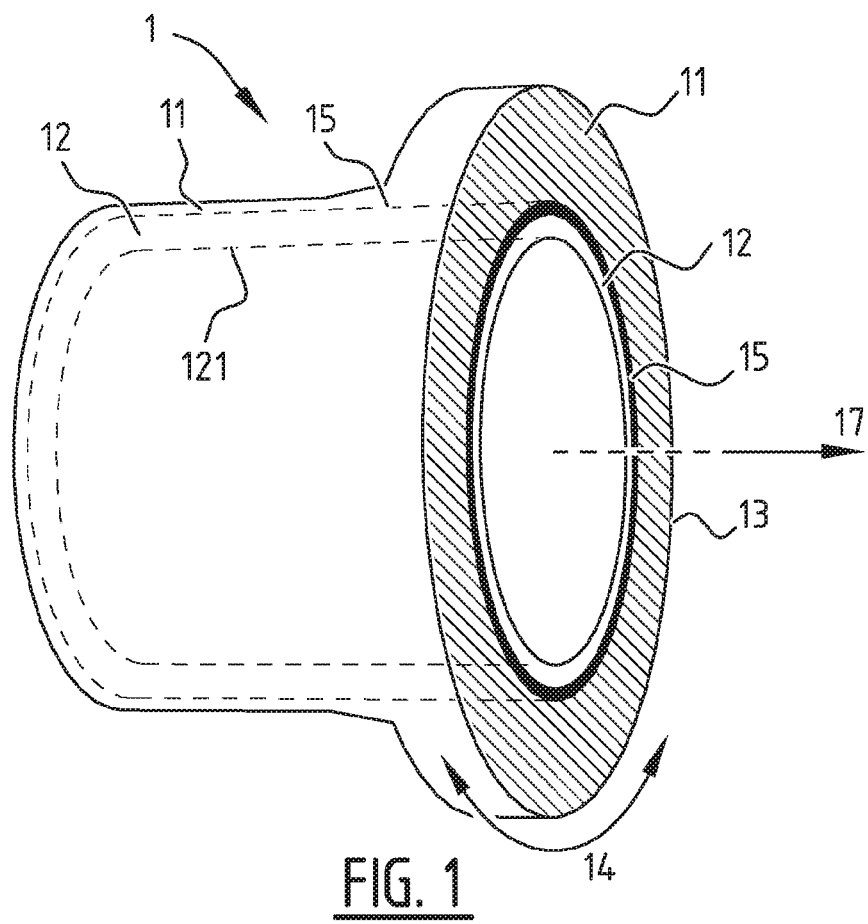
FIG. 1 schematically illustrates a perspective view of a fitting element in accordance with an embodiment of the invention.
Figure 2:
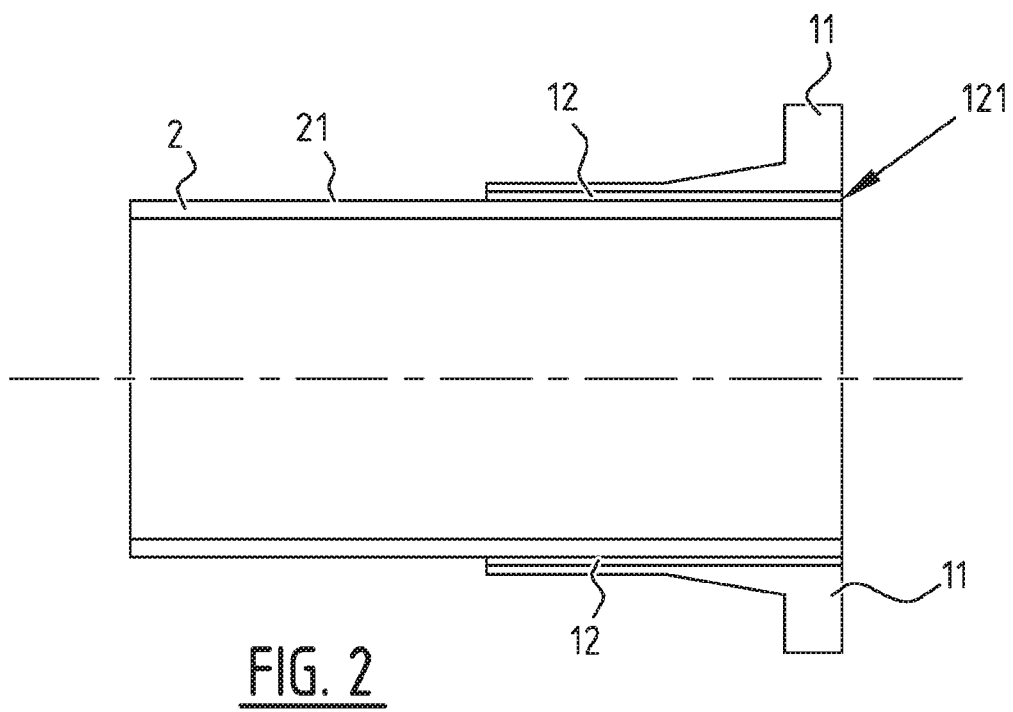
FIG. 2 schematically illustrates a cross-section of the fitting element of FIG. 1 in joint assembly with a liner.

Referring to FIG. 1, a perspective view of a fitting element 1 according to an embodiment of the invention is shown. The fitting element 1 is made of a composite material, comprising reinforcing fibers and a resin composition, for instance glass fiber-reinforced unsaturated polyester, and comprises a first part 11 of reinforcing fibers and a substantially fully cured resin composition. A second part 12 of the fitting element 1 comprises dry reinforcing fibers that form a bondable surface. This second part 12 is substantially free of resin composition in a fitting element 1 as such, i.e. as produced. The fitting element 1 comprises a circumferential body of which an outer circumferential shell forms the first part 11, and an inner circumferential shell forms the second part 12. Both circumferential shells of the fitting element 1 extend over the substantially complete circumference 13 of the fitting element 1 in a circumferential direction 14. An inner surface 121 of the second part 12 is available for contacting an outer surface 21 of a liner 2 (FIG. 2). An interface layer 15 of the fitting element 1 in between surfaces of the first part 11 and the second part 12 structurally connects the first 11 and second part 12. This interface layer 15 can for instance be formed by resin that originates from the first part 11 before curing and partially impregnates the second part 12 of dry reinforcement fibers.

FIG. 2 shows the coupling element 1 in a connected state with a liner 2 for rehabilitating a damaged pipe (section). The liner 2 typically comprises a composite article of reinforcing fibers and a resin composition, for instance a felt impregnated with an unsaturated polyester resin. An outer surface 21 of the liner is contacted with an inner surface 121 of the fitting element 1. The second part 12 of the element 1 can accept a curable resin composition that optionally originates from the uncured or partly cured liner 2 to form a functional joint between the fitting element 1 and at least a part of the liner 2. It is also possible to provide the second part 12 with a separate curable resin composition for this purpose.

Figure 3:
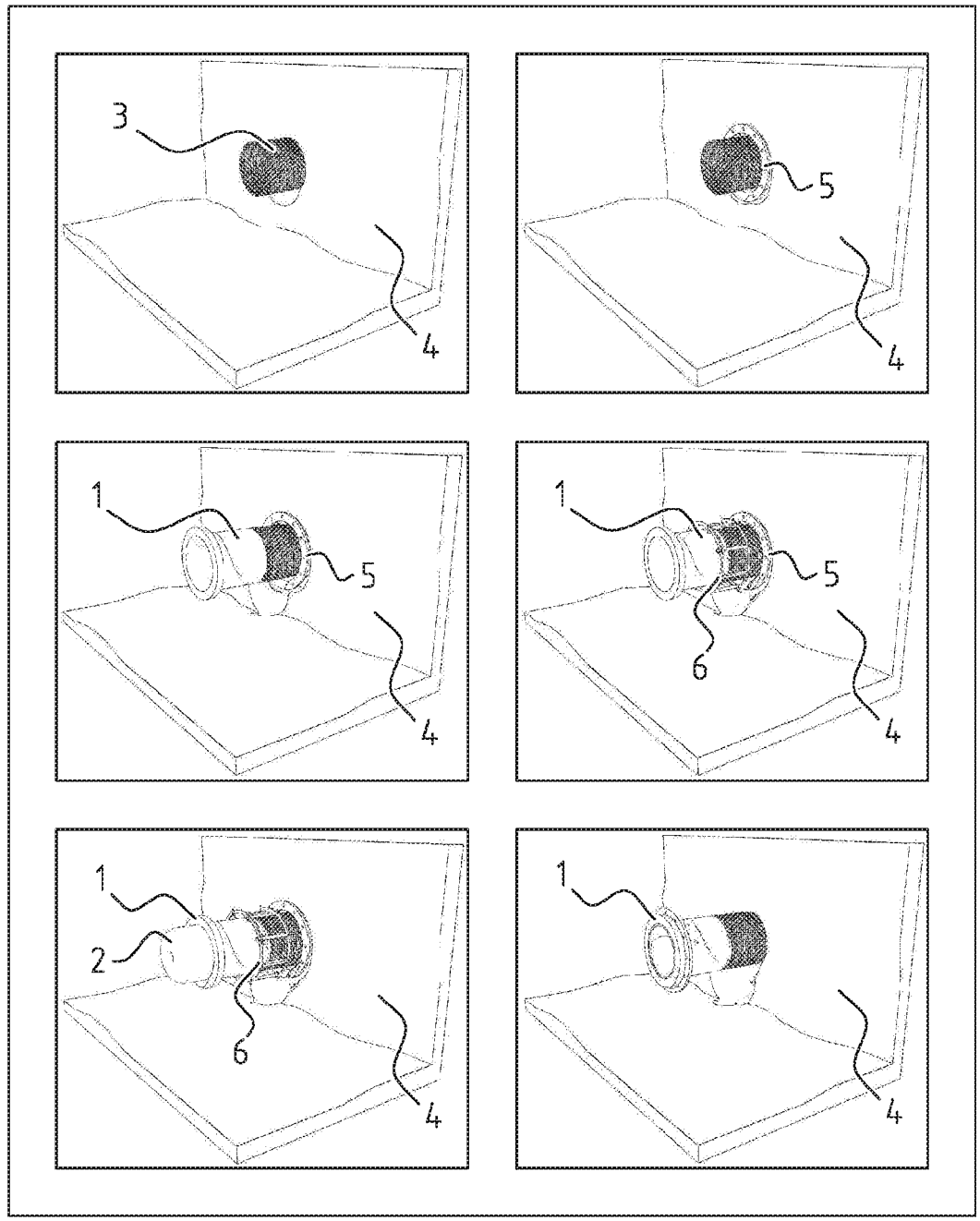
FIGS. 3A to 3F schematically illustrate part of an embodiment of a method for rehabilitation of a pipeline with a tubular liner using a fitting element in accordance with the invention.

The fitting element 1 is advantageously used in rehabilitating a damaged pipe (section) 3, as shown in FIGS. 3 and 4.

Referring to FIG. 3, the installation of a fitting element 1 to a damaged pipe line 3 is described. A first step typically comprises excavating a hole 4 in the bottom that makes access to the pipe 3 possible. The pipe 3 to be rehabilitated is then cut (top left figure). A backing flange 5 is brought around the pipe 3 and installed on the pipe 3 against a wall of the hole 4 (top right figure). A fitting element 1 according to the invention is then aligned coaxially with the original pipe 3 (middle left figure) such that an end face of the pipe 3 abuts against an end face of the fitting element 1. The fitting element 1 is fixated in this position to with a tool 6, as shown in the middle figure on the right. A liner 2 is then provided and reversed or pulled through the fitting element 1 and pressurized from the inside such that a good contact between the outer surface 21 of the liner 2 and an inner surface 121 of the fitting element 1 is achieved (bottom left figure). The resin composition of the liner 2 is then cured together with the fitting element 1 to form a strong joint between both. Hot water, UV light, ambient cure or steam may be used to perform the curing depending on the resin composition of the liner 2. Once cured, the liner 2 may be trimmed if needed, and is ready to be used, optionally after removal of the tool 6 (bottom right figure). The end face flange part of the fitting element 1 may be used for connection to another pipe segment and/or another fitting element 1, provided on another pipe segment.

Figure 4A:
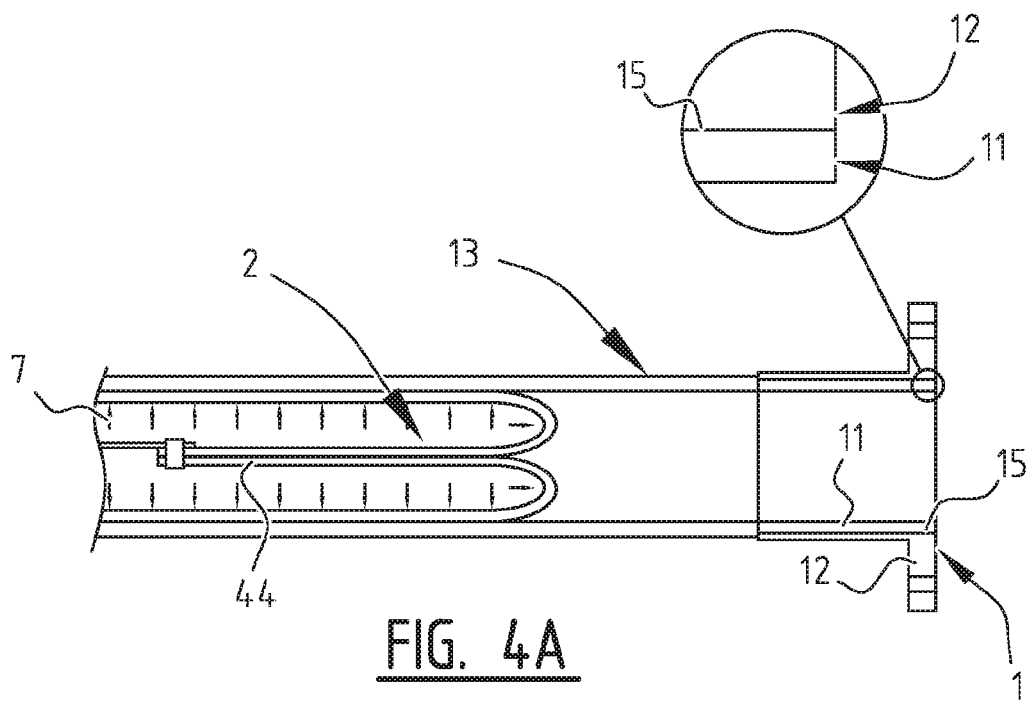
FIGS. 4A to 4C schematically illustrate another part of an embodiment of a method for rehabilitation of a pipeline with a tubular liner using a fitting element in accordance with the invention.
Figure 4B:
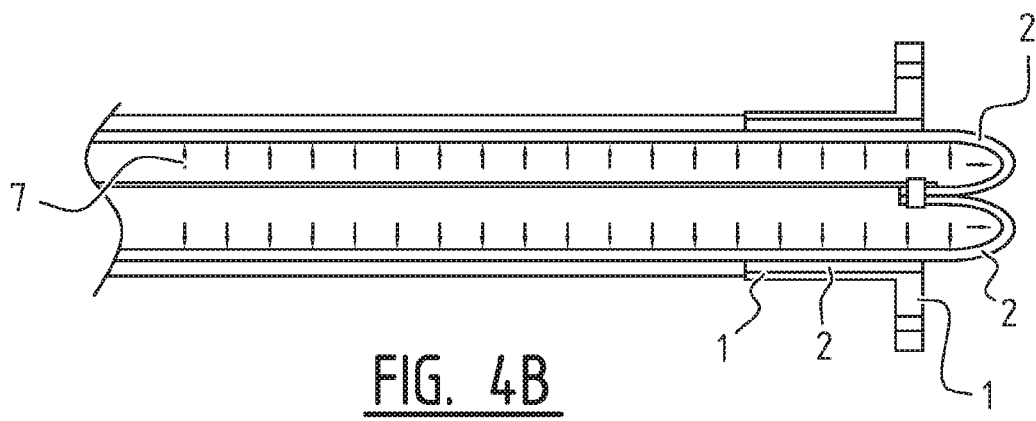
Figure 4C:
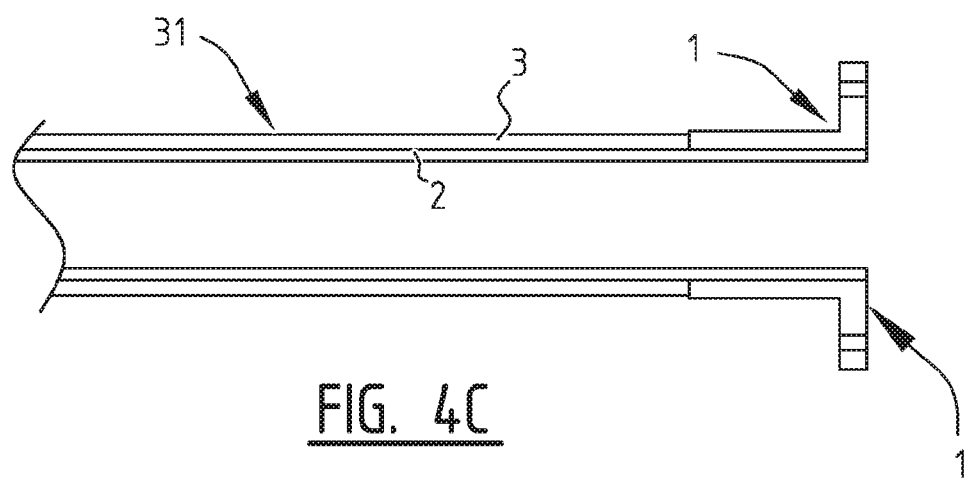

FIGS. 4A to 4C illustrate part of the above described rehabilitation method used to repair an existing pipeline 3. In the method, a resin saturated uncured or partially cured liner 2 in the form of a felt tube made of polyester/fiberglass cloth, or a number of other materials suitable for resin impregnation, is inverted and pulled into the damaged pipe 3. The liner 2 may be inverted using water or air pressure 7. A fitting element 1 is provided against an end face of the pipe 3. The liner 2 is inflated and advanced inside the pipe 3 until it contacts the fitting element 1 at an inner surface 121 of the first part 11 of the element 1. The first part 11 of the fitting element 1 comprising dry reinforcement only is in the process at least partly impregnated with resin originating from the liner 2. The impregnated first part 11 and the liner 2 are then co-cured, for instance by applying hot water, UV light, ambient temperature and/or steam. After cure, a tight-fitting, jointless and corrosion-resistant replacement pipe 31 is formed, having a flange that can be used for connection to other components in the rehabilitated pipe system. To make the flange (the end face of the fitting element 1) available for connection to other components (not shown), the liner 2 may be trimmed as shown in FIG. 4C.

After curing the liner 2 together with the fitting element 1, a strong joint is obtained between both. This results in an assembly of a liner 2 with an integrated fitting element 1. A good adhesion between the fitting element 1 and the liner 2 is of importance for structural integrity reasons, as the liner 2 tends to shrink away from the fitting element 1 upon and after curing. This can result in a delamination between the liner 2 and fitting element 1.

FIGS. 5A to 5E illustrate several configurations that yield an acceptable joint in the context of the invention.

FIGS. 5D and 5E illustrate a configuration in which the fitting element 1 has an inner surface 121 (meaning closest to the liner 2) that contains uncured or B-staged resin. Surface 121 is defined by a third part 16, comprising B-staged resin and a felt. This surface may cure together with an outer surface of the liner 2, forming a chemical bond (for instance obtained by cross-linking) between the resin compositions of both components, as shown in the figure on the right. In this embodiment, the strength of the joint may depend on the chemical compatibility and properties of the resin compositions. In FIG. 5D, the uncured or B-staged resin is provided in the felt and a thin interface layer 15 exists between cured part 11 (for instance glass fibers embedded in a cured resin) and part 16. In FIG. 5E, the uncured or B-staged resin is provided in the felt over part of its thickness only and another part of the thickness of the felt forms an interface layer 15 between cured part 11 (for instance glass fibers embedded in a cured resin) and part 16.

FIGS. 5A and 5B illustrate an improved configuration in which the fitting element 1 has an inner surface 121 (meaning closest to the liner 2) that contains dry reinforcement fibers only. Surface 121 is defined by a second part 12, comprising a felt in the embodiment shown. The inner disposed dry reinforcement part 12, which preferably has fibers in the out-of-plane direction (radial direction 17 of the fitting element 1) may for instance be made from felt or glass-fibers and is firmly joined to the cured part 11 of the fitting element 1. During installation the dry part 12 is impregnated with the same resin as the one used in the liner 2 or a compatible one. This resin can originate form the liner 2 or can be applied separately. After curing, part 12 will be firmly attached to both the liner 2 and part 1 of the fitting element 1, improving the joint's strength. In FIG. 5A, the felt contains dry fibers over part of its thickness only (forming part 12) and another part of the thickness of the felt forms an interface layer 15 between cured part 11 (for instance glass fibers embedded in a cured resin) and part 12. In FIG. 5B, the felt contains dry fibers over part of its thickness only (forming part 12) and another part of the thickness of the felt forms an interface layer 15 between cured part 11 (for instance glass fibers embedded in a cured resin) and part 12 by providing an adhesive.

FIG. 5C finally illustrates a hybrid configuration combining both mechanisms described above. In this embodiment, the felt contains dry fibers over part of its thickness only (forming part 12) and another part of the thickness of the felt comprises a B-staged resin third part 16. This interface layers exist between cured part 11, part 16 and part 12. In this embodiment, the fitting element 1 has an inner surface 121 (meaning closest to the liner 2) that contains dry reinforcement fibers only. Surface 121 is defined by a second part 12, comprising a felt in the embodiment shown.

Figure 6:
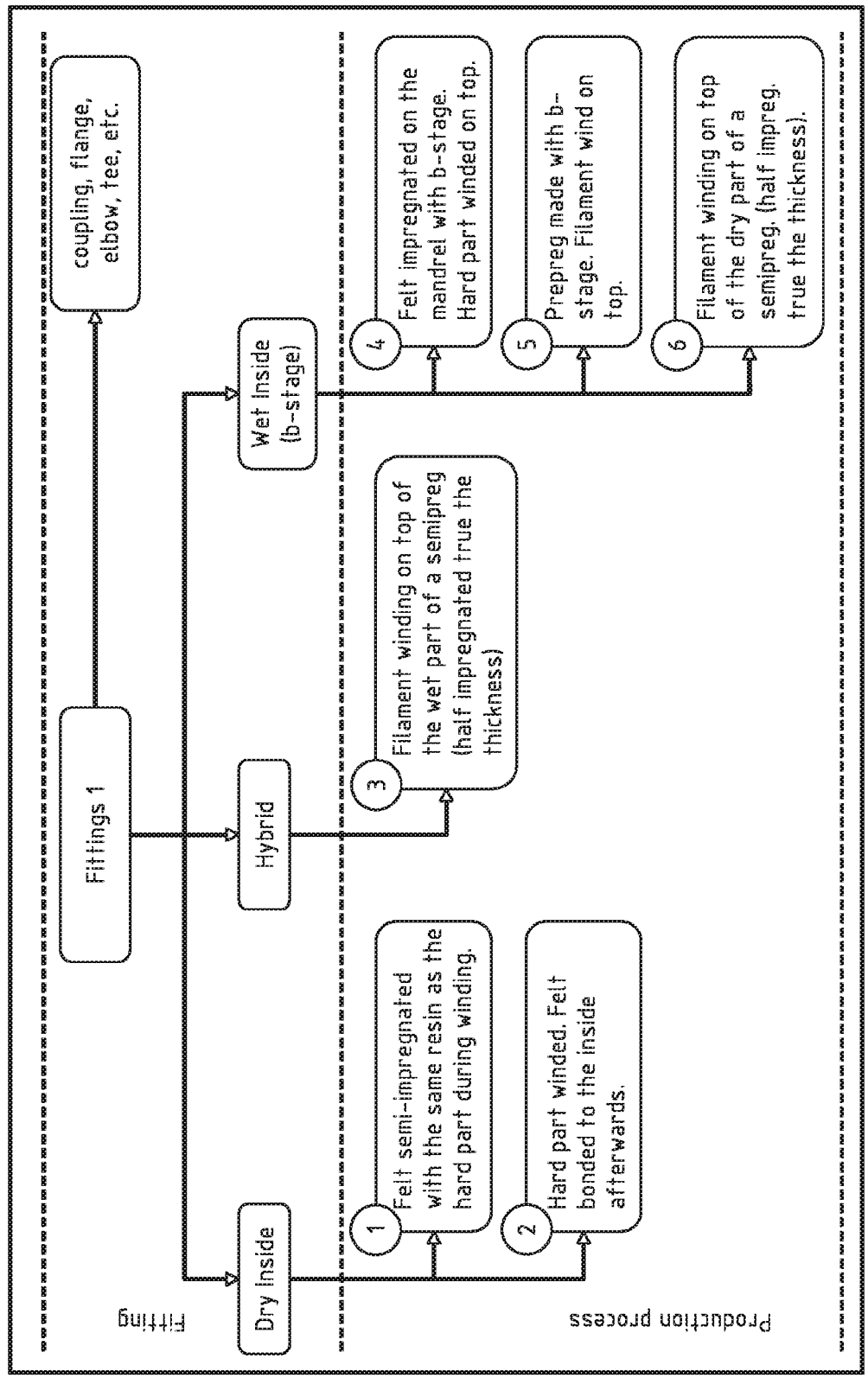
FIG. 6 schematically shows different embodiments of a method for manufacturing a fitting element in accordance with the invention.

FIG. 6 illustrates possible production method of fitting elements 1. As shown in this figure, fitting elements 1 can be produced in different ways. A practical manufacturing method comprises filament winding resin impregnated reinforcing fibers onto a mandrel to obtain an uncured part 1, wherein the mandrel was previously provided with dry reinforcement such as a felt. The fitting elements 1 can however be made in several other ways such as RTM and the reinforcing material of the dry part 1 can also be glass fiber or other materials. The chart flow provided in FIG. 6 gives some examples on how to make the fitting elements 1.

Figure 7:
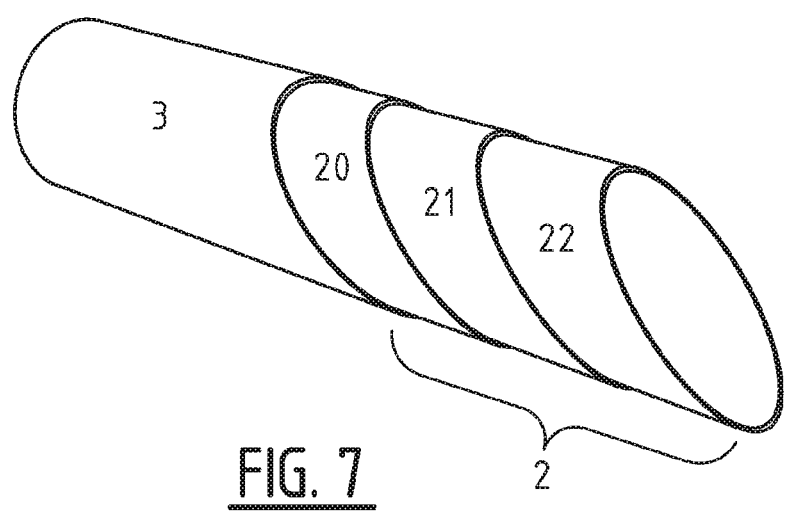
FIG. 7 schematically illustrates an embodiment of part of a rehabilitated pipe section in accordance with the invention.
Figure 8A:
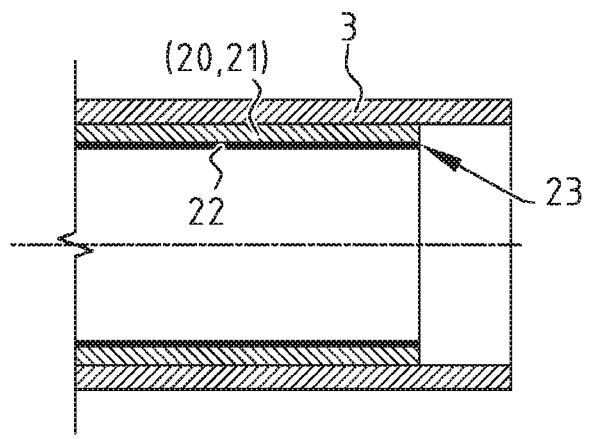
FIG. 8A schematically shows a cross-section of a known rehabilitated pipe section; while FIG. 8B schematically shows a cross-section of an improved rehabilitated pipe section on the right in accordance with an embodiment of the invention.
Figure 8B:
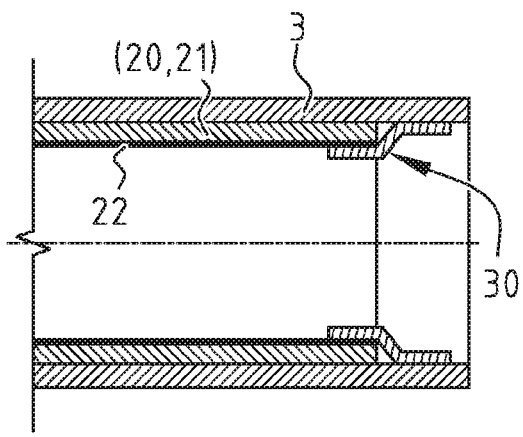
Figure 9A:
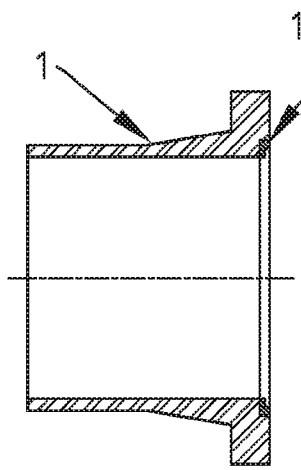
FIG. 9A schematically shows a cross-section of a fitting element in accordance with an embodiment of the invention.
Figure 9B:
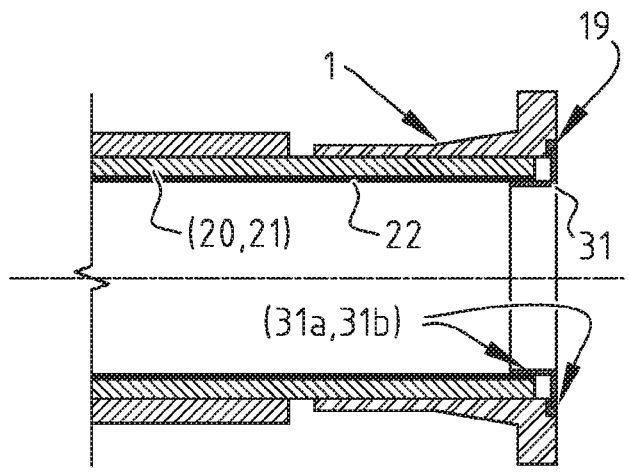
FIG. 9B schematically shows a cross-section of an assembly of the fitting element of FIG. 9A and a liner connected thereto.

With reference to FIGS. 7, 8 and 9, another embodiment of the invented fitting element 1 is disclosed. As shown in FIG. 7, CIPP liners 2 are commonly made from a structural layer 20 (e.g. a felt and/or glass fiber material form), of which a thickness part 21 may be resin-saturated, that is on an inner side provided with a thermoplastic layer known as a coating layer 22. Such a liner 2 may combine several functions. It may work as inflatable bladder during installation of the liner 2, it may provide a watertight surface and it may prevent chemicals in the used resin compositions from migrating into the medium running in the pipeline 3, such as drink water for instance.

A known problem is that, after installation and trimming of the liner 2, the front side of the liners structural layer (20, 21) is in direct contact with water, which can result in leakages and mechanical problems. Therefore, a seal to the front side edge 23 of the liner 2 is proposed, comprising a rubber seal 30, as shown in FIG. 8B.

An improved embodiment of the fitting element 1 comprises an insert 19, for instance in the form of a ring provided in a circumferential groove of the fitting element at a front side thereof. An exemplary embodiment comprises a thermoplastic insert 19 such that a thermoplastic sealing element 31 can be welded with one end part 31a to the coating layer 22 and with another end part 31b to the insert 19, as shown below. This provides an easy and reliable seal between fitting element 1 and liner 2.

The invention claimed is:

1. A fitting element for use in rehabilitation of pipelines with a liner, the fitting element comprising:
    a composite article of reinforcing fibers and a resin composition,
    wherein a first part of the fitting element comprises reinforcing fibers and a substantially fully cured resin composition,
    wherein a second part of the fitting element comprises dry reinforcing fibers that can accept a curable resin composition separately provided or originating from the liner to form a functional joint between the fitting element and at least a part of the liner, and
    wherein an interface layer of the fitting element structurally connects the first and the second part by comprising reinforcing fibers of the second part and resin from the first part.

2. The fitting element according to claim 1, wherein the reinforcing fibers of the first part differ from the reinforcing fibers of the second part in the material used and/or in their material form.

3. The fitting element according to claim 2, wherein the material form of the reinforcing fibers of the second part comprises a surface and that fibers extend in a direction that is out of this surface.

4. The fitting element according to claim 1, wherein the interface layer further comprises reinforcing fibers of the first part.

5. The fitting element according to claim 1, wherein the interface layer comprises an adhesive.

6. The fitting element according to claim 1, wherein a third part of the fitting element comprises a partially cured thermosetting resin composition such that it comprises reactive moieties.

7. The fitting element according to claim 6, wherein the reactivity and/or monomer composition of the first part differ from the reactivity and/or monomer composition of the third part.

8. The fitting element according to claim 1, wherein the fitting element comprises a circumferential body of which an outer circumferential shell forms the first part, and an inner circumferential shell forms the second part.

9. The fitting element according to claim 6, wherein a circumferential shell interposed between the outer and inner circumferential shells forms the third part.

10. The fitting element according to claim 8, wherein any one of the circumferential shells of the fitting element extends over the substantially complete circumference of the fitting element.

11. The fitting element according to claim 6, wherein the partially cured thermosetting resin composition is B-staged.

12. The fitting element according to claim 1, wherein the first part is continuous across the fitting element and provides dimensional stability to the fitting element and supports the second part.

13. The fitting element according to claim 1, comprising a protective part for a free edge of the liner.

14. The fitting element according to claim 13, wherein the protective part is connected to the liner.

15. The fitting element according to claim 14, wherein the protective part comprises a thermoplastic insert that is weldable to the liner to seal the free edge of the liner.

16. The fitting element according to claim 1, comprising a flange for coupling to another component of the pipeline system.

17. A method for manufacturing a fitting element in accordance with claim 1, the method comprising:
   providing a mold,
   applying dry reinforcing fibers onto a surface of the mold to form the second part,
   combining reinforcing fibers and a resin composition around the second part to form the first part of the fitting element, whereby resin from the first part partly impregnates reinforcing fibers of the second part, and
   curing the thermosetting resin composition to a substantially fully cured stage.

18. The method according to claim 17, wherein combining reinforcing fibers and a thermosetting resin composition to form the first part of the fitting element is performed by impregnating the reinforcing fibers with the resin composition and filament winding the impregnated reinforcing fibers onto the mold.

19. A method for rehabilitation of a pipeline with a tubular liner of reinforcing fibers and a curable resin composition, the method comprising:
   providing a fitting element in accordance with claim 1 in coaxial alignment with an end of the pipeline,
   providing a part of the liner under pressure against at least the second part of the fitting element, and
   curing the curable resin composition of the liner, whereby a liner curable resin composition is accepted by the dry reinforcing fibers of the second part to form a functional joint between the fitting element and the liner part, and/or a curable resin composition is applied to the second part and co-cured to form the functional joint.

20. A joined assembly of a fitting element in accordance with claim 1 and a liner for rehabilitating a pipeline, wherein a second part of the fitting element and an edge part of the liner overlap in a bondable area and are substantially fully cured to form a functional joint.

* * * * *